Jan. 25, 1955  R. C. MEIER, JR  2,700,493
BICYCLE BASKET
Filed Dec. 31, 1949
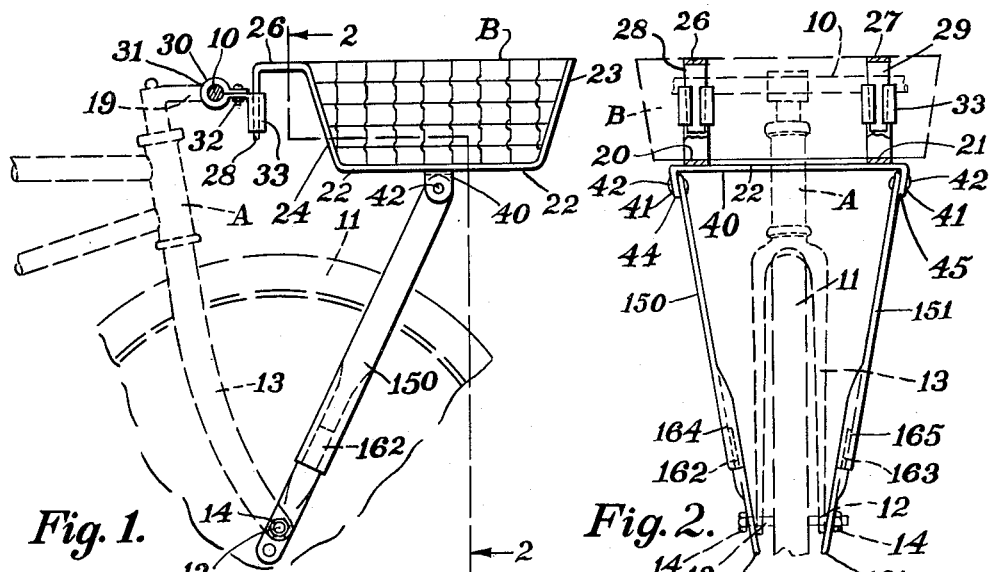
Fig. 1.   Fig. 2.
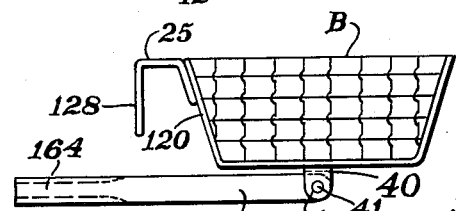  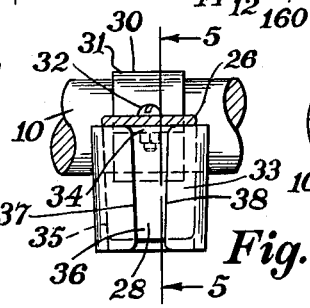
Fig. 3.   Fig. 4.   Fig. 5.
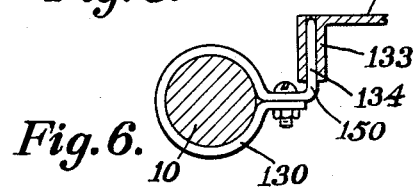
Fig. 6.
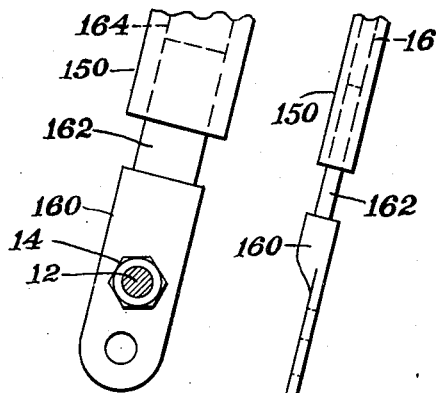  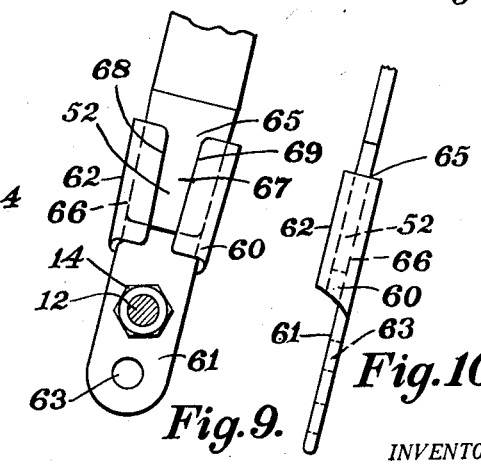
Fig. 7.   Fig. 8.   Fig. 9.   Fig. 10.
INVENTOR.
Robert C. Meier Jr.
BY
Pearson + Pearson
attorneys.

United States Patent Office

2,700,493
Patented Jan. 25, 1955

2,700,493

BICYCLE BASKET

Robert C. Meier, Jr., Salem, N. H.

Application December 31, 1949, Serial No. 136,378

11 Claims. (Cl. 224—36)

This invention relates to bicycle baskets.

The object of my invention is to provide a basket which may be easily and quickly removed from the bicycle when not needed, thus lightening the weight and streamlining the appearance thereof. A further object is to so construct the basket that its supporting legs are foldable to make a compact unit when removed from the bicycle. A still further object is to provide brackets, arranged to remain on the bicycle ready for engagement with the basket supports, which are unobtrusive and which grasp the basket supports with a firm grip releasable by an upward pull.

I am aware that bicycle baskets have been connected to various portions of the bicycle frame by means of nuts and bolts, by spring catches and similar means. In my device however, the basket is provided with a pair of rear supporting arms and a pair of lower supporting legs each of which have a sliding engagement with suitable brackets and the brackets are mounted on the bicycle by nuts and bolts or similar means. The important feature of my device is, therefore, that a simple upward pull disengages the supporting members from the brackets and thereafter the legs can be folded parallel to the arms and against the basket bottom.

In the drawings, Fig. 1 is a side elevation of the preferred form of my device mounted at the front of a bicycle.

Fig. 2 is a front elevation of the device on line 2—2 of Fig. 1.

Fig. 3 is a side elevation of the basket removed from the bicycle and with the legs in folded position.

Fig. 4 is an enlarged fragmentary sectional view of an arm and arm bracket of my device in the preferred form on line 4—4 of Fig. 5.

Fig. 5 is a side view on line 5—5 of Fig. 4.

Fig. 6 is an enlarged fragmentary view of a modification.

Fig. 7 is a fragmentary side view and

Fig. 8 is a front view of the preferred form of leg and leg bracket of my device.

Fig. 9 is a fragmentary side view and

Fig. 10 is a fragmentary front view of a modification.

As shown, A is the bicycle frame having a handle bar 10, a handle bar post 19, a front wheel 11 and a front wheel hub axle 12, the wheel and axle being retained in front fork 13 by nuts 14, 14.

The basket B is provided with strengthening straps of sheet metal 20, 21 which extend along the bottom 22, front 23 and back 24 of the basket. As shown in Fig. 3, an arm 25 may be welded to the back of a strap 120 or as shown in Figs. 1, 2, 4 and 5, the arms 26 and 27 each may be integral with a strap 20, 21 and bent therefrom.

Each arm 25, 26 or 27 extends horizontally from the rear of the upper portion of the basket to a point just in front of handle bar 10 where it is bent downwardly to form a downwardly depending substantially vertical tongue 128, 28 or 29. I provide an arm bracket 30, having a clamping portion 31, tightened by a nut and bolt at 32, and having an arm tongue holding section 33 integral therewith so that it is located in front of handle bars 10. The arm tongue holding section 33 may be of C-shaped cross section and has a mouth 34 to receive tongue 28, an elongated slot 35 to accommodate the tongue and an elongated opening 36 between the opposite edges 37, 38 of 33.

As shown in Fig. 6, I may use a bracket 130 having a portion 150 provided with an upstanding tongue 134 and may use an arm 126 having a tongue holding portion 133, similar to 33, but I prefer the construction shown in Figs. 4 and 5.

I may use spring metal for the section 33 or 133 of my device so that the ends 37 and 38 will have inherent contractility and will hold tongue 28 with a spring pressure. In the event that a heavy load in basket B causes an arm tongue 28 to become tightly engaged in 33, or a leg tongue 52 in 66, it is only necessary to insert a coin or similar edge in openings 36 or 37 and twist the same to quickly disengage the tongue.

It should be noted that my arm bracket can be revolved on the handle bar 10 through a half circle and, whether it is tapered or of uniform cross section, a tongue 28 may still be inserted to permit the basket to be in a more rearward position if desired. It is also obvious that the arm 26 may be of sufficient length so that the handle bar post 19 may be reversed and still be usable with my device.

I provide a U-shaped strengthening strap 40 of metal mounted on the bottom 22 of the basket and attached in any convenient manner to the straps 20, 21 so that strap 40 extends transversely thereof. A pivot pin hole 41 is provided in each of the downwardly depending portions 44, 45 of strap 40, for a pin 42 by which a leg such as 150, 151 is pivotally mounted to turn in the direction of arms 26, 27. Legs 150 and 151 extend downwardly toward the hub axle and their lower portions are formed into a C-shaped cross section at 164, 165 in the preferred form of my device.

As shown in Figs. 7 and 8, I provide a leg supporting bracket 160, 161, on each side of hub axle 12, each provided with an upstanding tongue 162, 163, and the supporting legs 150, 151, each have a C-shaped slot in 164, 165, which fits around tongues 162 and 163.

As a modification, I may use a leg bracket 60, having a lower portion 61 with aligned perforations 63 for the hub axle 12, the bracket being fixed to the hub axle between the fork 13 and axle nuts 14. Brackets such as 60 or 160 may be turned on axle 12 to any desired angle. A leg tongue holding section 62 forms the upper portion of 60, similar to 33, and may be welded thereto or integral therewith. The leg tongue holding section 62 is preferably of C-shaped cross section with a mouth 65 to receive tapered tongue 52 and forms an elongated slot 66 for accommodating the tongue and an elongated opening 67 between the opposite edges 68, 69, of 67.

If desired the tongues of my device may be tapered and the tongue receiving sections of my brackets may be of C-shaped cross section, but it is obvious that the tongues may be untapered and of uniform circular or non-circular cross section and the tongue receiving slots may be of similar cross section. My preferred construction shown in Figs. 1 and 2 assures a close and tight fit without danger of rattling or undesirable pivoting of the basket.

The essence of my idea is the use of fixed brackets on the bicycle and arms and legs on the basket, the arms and legs having a sliding engagement with the brackets by means of tongues and slots.

In operation, the arm and leg brackets 30 and 160 of the preferred form of my device are mounted on the bicycle with the arm tongue receiving slots 35 and the leg tongues 162 in the correct position to accommodate tongues 28 of the basket arms 26, 27, and slots 164 of legs 150, 151. The basket B can be removed from its folded position as shown in Fig. 3, the legs revolved on pivot 41 and the tapered tongues 28, 29, and 162, 163, inserted in the appropriate tongue receiving slots. To remove basket B, an upward pull disengages all four tongues from their slots and the basket may again be stored in collapsed condition.

I claim:

1. A slidably removable basket for bicycles comprising a pair of supporting arms extending rearwardly from the rear of a basket each provided with a downwardly extending tongue located in front of the bicycle handle bars; a pair of removable arm holding brackets mounted on each side of the handle bars, each provided with an arm tongue holding section including an upwardly extending receiving slot for an arm tongue located in front of said handle bars; a pair of supporting legs, pivotally mounted on the bottom of the basket and extending downwardly toward the hub axle of the front wheel of said bicycle each provided with a tongue at the free lower end thereof; and a pair of removable leg holding brackets mounted on each side of said hub axle each provided with a leg tongue holding section including an upwardly extending receiving slot for a leg tongue.

2. A slidably removable basket for bicycles comprising a pair of supporting arms extending rearwardly from the rear of a basket each provided with a downwardly extending tongue located in front of the bicycle handle bars; a pair of removable arm holding brackets mounted on each side of the handle bars, each provided with an arm tongue holding section including an upwardly extending receiving slot for an arm tongue located in front of said handle bars; a pair of supporting legs, pivotally mounted on the bottom of the basket and extending downwardly toward the hub axle of the front wheel of said bicycle each provided with a tongue at the free lower end thereof; and a pair of removable leg holding brackets mounted on each side of said hub axle each provided with a leg tongue holding section including an upwardly extending receiving slot for a leg tongue, the tongues of each arm and leg being tapered for a wedging engagement with the slots in the arm and leg brackets.

3. A slidably removable basket for bicycles comprising a pair of supporting arms extending rearwardly from the rear of a basket each provided with a downwardly extending tongue located in front of the bicycle handle bars; a pair of removable arm holding brackets mounted on each side of the handle bars, each provided with an arm tongue holding section including an upwardly extending receiving slot for an arm tongue located in front of said handle bars; a pair of supporting legs, pivotally mounted on the bottom of the basket and extending downwardly toward the hub axle of the front wheel of said bicycle each provided with a tongue at the free lower end thereof; and a pair of removable leg holding brackets mounted on each side of said hub axle each provided with a leg tongue holding section including an upwardly extending receiving slot for a leg tongue, the tongue holding sections of each arm and leg holding bracket being of C-shaped cross section to form an elongated tongue receiving slot with an elongated opening therein.

4. A slidably removable basket for bicycles comprising a pair of supporting arms extending rearwardly from the rear of a basket each provided with a downwardly extending tongue located in front of the bicycle handle bars; a pair of removable arm holding brackets mounted on each side of the handle bars, each provided with an arm tongue holding section including an upwardly extending receiving slot for an arm tongue located in front of said handle bars; a pair of supporting legs, pivotally mounted on the bottom of the basket and extending downwardly toward the hub axle of the front wheel of said bicycle each provided with a tongue at the free lower end thereof; and a pair of removable leg holding brackets mounted on each side of said hub axle each provided with a leg tongue holding section including an upwardly extending receiving slot for a leg tongue, the tongues of each arm and leg being tapered for a wedging engagement with the slots in the arm and leg brackets, and the tongue holding sections of each arm and leg holding bracket being of C-shaped cross section to form an elongated tongue receiving slot with an elongated opening therein.

5. A slidably removable unit for bicycles comprising a bicycle basket; a pair of arm holding brackets, each detachably mounted at a spaced distance on an opposite side of the centre of a pair of bicycle handle bars and each having a forward portion in front of, but proximate, said handle bars detachably and slidably secured to an arm; a pair of arms, each rigidly attached to and extending rearwardly from the upper portion of the rear of said basket, each arm having a downwardly depending portion detachably and slidably secured to the forward portion of an arm holding bracket; a pair of leg holding brackets each having an axle aperture and retained on an opposite side of the bicycle axle by the axle nuts and each having an upper portion above, but proximate said axle detachably and slidably secured to a leg; and a pair of legs, each pivotally attached intermediate of the underside of said basket, and each having its lower terminal portion detachably and slidably secured to the upper portion of a leg holding bracket.

6. A unit as specified in claim 5 wherein the forward portion of each arm holding bracket includes a straight, deep tongue slot, the downwardly depending portion of each arm includes a straight tongue closely fitting said arm slot, the terminal portion of each leg includes a straight, deep tongue slot and the upper portion of each leg holding bracket includes a straight tongue closely fitting said leg slot.

7. A slidably removable unit for bicycles comprising a bicycle basket; a pair of arm brackets each spaced on an opposite side of the bicycle handle bars and extending forwardly of the handle bars; a pair of leg brackets, each having an axle aperture and retained on the bicycle axle by the axle nuts and each extending upwardly from the axle; a pair of arms each extending rearwardly from the upper portion of the rear of the bicycle basket and each releasably and slidably secured to the forwardly portion of an arm bracket; a pair of legs, each extending downwardly from the underside of the bottom of the basket and each releasably and slidably secured to the upper portion of a leg bracket; and tapered tongue and C-shaped slot means for releasably and slidably securing said arms and legs to said brackets.

8. A slidably removable basket for a bicycle comprising a pair of arm brackets each having a clamping section mounted on an opposite side of the centre of a pair of bicycle handle bars and each having an arm securing section closely spaced from, but in advance of, said handle bars; a pair of leg brackets each having a clamping section, mounted on an opposite side of said axle apertured to receive the bicycle axle and each having a leg securing section closely spaced from, but above the level of, said axle; a pair of arms rigidly mounted on said basket, each arm extending rearwardly and then downwardly therefrom with a terminal section detachably and slidably secured to the securing section of an arm holding bracket and a pair of legs each pivotally mounted below said basket and each having a terminal section detachably and slidably secured to the securing section of a leg holding bracket.

9. A basket as specified in claim 8 wherein the terminal section of each arm and leg is a straight, flat, elongated tongue and the securing section of each bracket includes a straight flat deep slot closely fitting around one of said tongues.

10. A basket as specified in claim 8 wherein the arm securing section of each arm bracket as well as each arm are both of resilient metal for enabling flexing in a vertical plane.

11. A bicycle basket comprising a pair of longitudinally extending metal straps, each mounted under an opposite side of the longitudinal centre line of the basket, said straps extending up the rearward wall of the basket; a pair of rearward extensions, each permanently fixed to a strap and each having a downwardly depending terminal tongue in rear of the basket; a laterally extending metal strap centrally disposed under the basket and bent downwardly at each opposite end to form a pair of pivot supports, a pair of legs, each pivotally mounted at its upper end to a pivot support and each having a tongue at the lower terminal end thereof; a pair of handle bar brackets, each having clamping means for attachment around a bicycle handle bar and each having an upwardly extending slot for slidably receiving the tongue of one of said rearward extensions and a pair of axle brackets, each having an aperture for mounting the same on the bicycle axle by the axle nut and each having an upwardly extending slot for slidably receiving the tongue of a basket leg.

References Cited in the file of this patent

UNITED STATES PATENTS

| 515,622 | Steen | Feb. 27, 1894 |
| 1,359,329 | Carson | Nov. 16, 1920 |
| 2,183,822 | Pawsat | Dec. 19, 1939 |
| 2,457,624 | Aleks | Dec. 28, 1948 |
| 2,498,446 | Pawsat | Feb. 21, 1950 |
| 2,531,902 | Baron | Nov. 28, 1950 |
| 2,583,550 | Dennis et al. | Jan. 29, 1952 |

FOREIGN PATENTS

| 24,828 | Great Britain | 1907 |
| 436,784 | France | Feb. 1, 1912 |
| 22,207 | Great Britain | Sept. 30, 1912 |
| 19,827 | Great Britain | Sept. 2, 1913 |
| 212,435 | Great Britain | Mar. 13, 1924 |
| 576,679 | Germany | May 15, 1933 |